United States Patent
Tanaka (10) Patent No.: US 8,659,195 B2
(45) Date of Patent: Feb. 25, 2014

(54) MOTOR ROTOR AND COMPRESSOR PROVIDED WITH THE SAME

(75) Inventor: Junya Tanaka, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 127 days.

(21) Appl. No.: 13/257,539

(22) PCT Filed: Mar. 25, 2010

(86) PCT No.: PCT/JP2010/055251
§ 371 (c)(1),
(2), (4) Date: Sep. 19, 2011

(87) PCT Pub. No.: WO2010/113766
PCT Pub. Date: Oct. 7, 2010

(65) Prior Publication Data
US 2012/0007455 A1 Jan. 12, 2012

(30) Foreign Application Priority Data
Mar. 31, 2009 (JP) .................................. 2009-086486

(51) Int. Cl.
*H02K 7/00* (2006.01)
(52) U.S. Cl.
USPC .............................................. 310/66; 310/51
(58) Field of Classification Search
USPC ..................... 310/51, 66, 156.51–156.65
See application file for complete search history.

(56) References Cited

U.S. PATENT DOCUMENTS

| | | | | |
|---|---|---|---|---|
| 4,388,756 A | * | 6/1983 | Burns | 29/598 |
| 5,666,015 A | * | 9/1997 | Uchibori et al. | 310/51 |
| 6,533,558 B1 | * | 3/2003 | Matsumoto et al. | 417/410.3 |
| 6,540,489 B1 | * | 4/2003 | Higashiyama | 417/410.1 |
| 6,582,207 B2 | * | 6/2003 | Matsumoto et al. | 417/410.1 |
| 8,337,185 B2 | * | 12/2012 | Tanaka | 418/270 |
| 2004/0145263 A1 | * | 7/2004 | Kojima et al. | 310/156.23 |
| 2010/0061868 A1 | * | 3/2010 | Kojima | 417/410.1 |

FOREIGN PATENT DOCUMENTS

| | | |
|---|---|---|
| CN | 101334018 A | 12/2008 |
| JP | 6-38474 A | 2/1994 |
| JP | 2000-324770 A | 11/2000 |
| JP | 2001-197693 A | 7/2001 |

(Continued)

OTHER PUBLICATIONS

International Search Report, w/ English translation thereof, issued in International Patent Application No. PCT/JP2010/055251, dated Jun. 22, 2010.

(Continued)

*Primary Examiner* — Thanh Lam
(74) *Attorney, Agent, or Firm* — McDermott Will & Emery LLP (57) ABSTRACT

There is provided a compressor provided with a motor rotor capable of suppressing a decrease in oil separation efficiency and avoiding a decrease in motor efficiency. A motor rotor (10) includes a substantially cylindrical rotor laminated steel plate including a permanent magnet therein. The rotor laminated steel plate includes a plurality of refrigerant gas holes (18) passing therethrough in the axial direction and a plurality of rivet holes (20) arranged in the circumferential direction and passing therethrough in the axial direction. At least one of the rivet holes (20) is used as a positioning hole (20b) to insert a positioning pin for positioning in the rotation direction at the time of rotor magnetization.

8 Claims, 6 Drawing Sheets

(56) References Cited

FOREIGN PATENT DOCUMENTS

| | | |
|---|---|---|
| JP | 2001197693 A | 7/2001 |
| JP | 2003-018803 A | 1/2003 |
| JP | 2005-143299 | 6/2005 |
| JP | 2008-014320 | 1/2008 |
| JP | 2008-263663 A | 10/2008 |
| JP | 2008263663 A | 10/2008 |
| JP | 2008-283823 A | 11/2008 |

OTHER PUBLICATIONS

Chinese Office Action issued in Application No. 2013090400829390 dated Sep. 9, 2013.

* cited by examiner

PRIOR ART

MOTOR ROTOR AND COMPRESSOR PROVIDED WITH THE SAME

RELATED APPLICATIONS

This application is the U.S. National Phase under 35 U.S.C. §371 of International Application No. PCT/JP2010/055251, filed on Mar. 25, 2010, which in turn claims the benefit of Japanese Application No. 2009-086486, filed on Mar. 31, 2009, the disclosures of which Applications are incorporated by reference herein.

TECHNICAL FIELD

The present invention relates to a motor rotor and a compressor provided with the same, more particularly, to a motor rotor having a plurality of holes including a refrigerant gas hole and a rivet hole, and a sealed rotary compressor such as a scroll compressor provided with the motor rotor.

BACKGROUND ART

Figure 7:
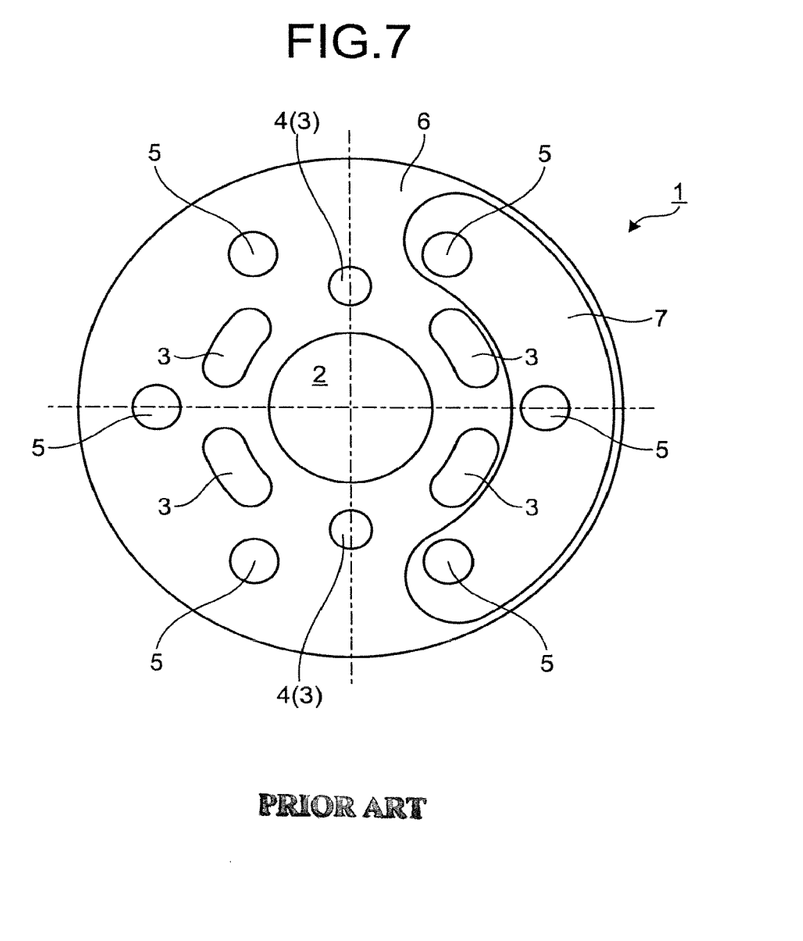
FIG. 7 is a top view of an example of a conventional motor rotor.

There has been known a motor rotor used in sealed rotary compressors such as scroll compressors (see, for example, Patent Documents 1 and 2). FIG. 7 is a top view of a conventional 6-pole motor rotor. As illustrated in FIG. 7, a rotor 1 is provided with four elongated refrigerant gas holes 3 and two positioning holes 4 around a shaft hole 2. There are also provided six rivet holes 5 on the outside in the radial direction of the rotor 1. The positioning holes 4 double as refrigerant gas holes 3.

Passing through the rivet holes 5 are rivets that fix components of the rotor 1 including a rotor core (a rotor laminated steel plate), an end plate 6, a magnet (a permanent magnet), a balance weight 7, and an oil separation plate. The refrigerant gas holes 3 are through holes each forming a path of refrigerant gas to improve the oil separation efficiency. In the process of magnetization of the rotor 1, positioning pins are inserted into the positioning holes 4 to set the rotation position of the rotor 1 to a predetermined position.

In the manufacturing process of a rotary compressor, the rotor is magnetized after being fixed to the shaft extending from the compression unit in the casing by shrink fitting. In the magnetization of the rotor, the rotor and a magnetizer each need to be set at a predetermined position in the rotation direction, and thus positioning pins are inserted into the positioning holes of the rotor to set the position of the rotor in the rotation direction at a predetermined position. In this case, since the rotor is fixed to the shaft extending from the compression unit by shrink fitting, the positioning pins are inserted into the rotor through the positioning holes located on the rotor end surface on the opposite side of the compression unit distant from the compression unit. During the magnetization, a magnetic force is exerted to rotate the rotor. Accordingly, the positioning pins also prevent the rotation of the rotor at the time of positioning.

Patent Document 1: Japanese Patent Application Laid-open No. 2005-143299
Patent Document 2: Japanese Patent Application Laid-open No. 2008-14320

DISCLOSURE OF INVENTION

Problem to be Solved by the Invention

In the conventional rotor 1 illustrated in FIG. 7, two of the six refrigerant gas holes 3 are used as the positioning holes 4. To improve the oil separation efficiency, it is effective to increase the refrigerant gas hole area. Therefore, the four refrigerant gas holes 3 are elongated in the circumferential direction of the rotor 1. If all the refrigerant gas holes 3 are formed in the same elongated shape, it is difficult to use them as positioning holes. For this reason, the refrigerant gas holes 3 (the positioning holes 4) used for positioning are circular in shape. This reduces the area of the refrigerant gas holes 3, thereby reducing the oil separation efficiency. On the other hand, if the circular area of the refrigerant gas holes 3 (the positioning holes 4) used for positioning is increased, this narrows the magnetic path in the rotor 1, resulting in lower motor efficiency.

In the case of a structure in which the oil separation plate is attached to the rotor, since the oil separation plate is located on the end surface on the opposite side of the compression unit, positioning holes or notches can be formed in the oil separation plate. However, if the oil separation plate is formed of a thin plate to lower the cost, the strength decreases. As a result, the oil separation plate may be deformed due to a rotational force generated during the magnetization, and it is necessary to form positioning holes in the rotor core. In this case, there is a need to form holes equal to or larger than the positioning holes in the oil separation plate at positions corresponding to the positioning holes of the rotor core. If the refrigerant gas holes used as the positioning holes are widened to improve the oil separation efficiency, this creates a need to form large holes also in the oil separation plate. However, if there are large holes in the oil separation plate, the oil separation plate may not achieve sufficient oil separation efficiency.

In the case where the positioning holes are provided independently of the refrigerant gas holes, the positioning holes need to be located at positions where they do not cause adverse effects on the magnetic path in the rotor. This imposes more design limitations, and also may result in lower motor efficiency.

The present invention has been made to solve the above problems in the conventional technology and it is an object of the present invention to provide a motor rotor and a compressor provided with the same capable of suppressing a decrease in oil separation efficiency and avoiding a decrease in motor efficiency.

Means for Solving Problem

To solve the problems and achieve the object mentioned above, according to the invention set forth in claim 1, a motor rotor includes a substantially cylindrical rotor laminated steel plate including a permanent magnet therein. The rotor laminated steel plate includes a plurality of refrigerant gas holes passing through the rotor laminated steel plate in the axial direction and a plurality of rivet holes arranged in the circumferential direction and passing through the rotor laminated steel plate in the axial direction. At least one of the rivet holes is used as a positioning hole to insert a positioning pin for positioning in the rotation direction at the time of rotor magnetization.

According to the invention set forth in claim 2, the motor rotor of claim 1 further includes an oil separation plate that is arranged concentrically on an end surface of the rotor laminated steel plate. The oil separation plate is provided with a hole that allows the positioning pin to be inserted therethrough at a position corresponding to the positioning hole.

According to the invention set forth in claim 3, in the motor rotor of claim 1 or 2 with six rotor poles, the rivet holes are arranged at six positions equally spaced apart in the circumferential direction. Three of the rivet holes arranged equally spaced apart in the circumferential direction are used as dedicated rivet holes into which only rivets are inserted. Other rivet holes are each used as the positioning hole.

According to the invention set forth in claim 4, a compressor is provided with the motor rotor of any one of claims 1 to 3.

Effect of the Invention

According to the present invention, a motor rotor includes a substantially cylindrical rotor laminated steel plate including a permanent magnet therein. The rotor laminated steel plate includes a plurality of refrigerant gas holes passing through the rotor laminated steel plate in the axial direction and a plurality of rivet holes arranged in the circumferential direction and passing through the rotor laminated steel plate in the axial direction. At least one of the rivet holes is used as a positioning hole to insert a positioning pin for positioning in the rotation direction at the time of rotor magnetization. With this, there is no need to change the shape of the refrigerant gas holes that influence the oil separation efficiency, and also no positioning hole is required independently of the rivet holes. Accordingly, it is possible to avoid adverse effects on the magnetic path in the rotor. Thus, it is possible to suppress a decrease in oil separation efficiency and to avoid a decrease in motor efficiency.

EXPLANATIONS OF LETTERS OR NUMERALS

10 Motor rotor
10a Rotor end surface
12 Shaft hole
14 Rotor laminated steel plate
16a, 16b Rotor end plate
18 Refrigerant gas hole
20 Rivet hole
21 Magnet (permanent magnet)
20a Dedicated rivet hole
20b Positioning hole
22a, 22b Balance weight
24 Oil separation plate
26 Through hole
28a, 28b, 28c Rivet
30 Protrusion
32 Recess
34 Compression unit
36 Shaft
100 Rotary compressor (compressor)

BEST MODE(S) FOR CARRYING OUT THE INVENTION

Exemplary embodiments of a motor rotor and a compressor provided with the same according to the present invention will be described in detail below with reference to the accompanying drawings taking a 6-pole rotor as an example. However, the present invention is not limited to the following embodiments.

Embodiment

Figure 1:
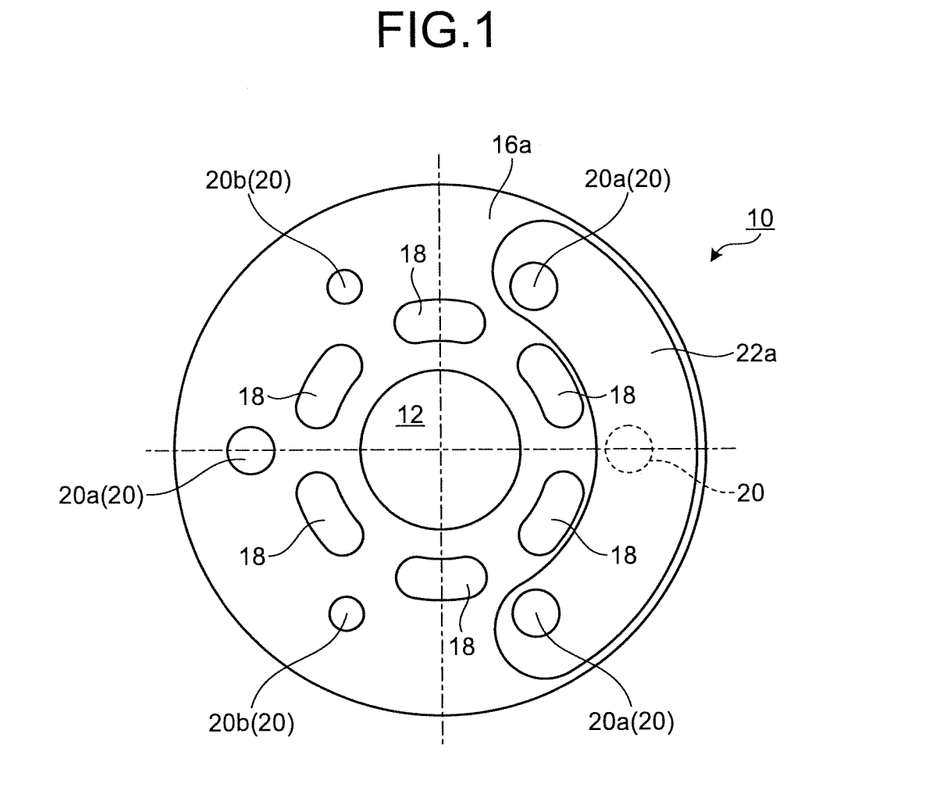
FIG. 1 is a top view of a motor rotor according to an embodiment of the present invention.
Figure 2:
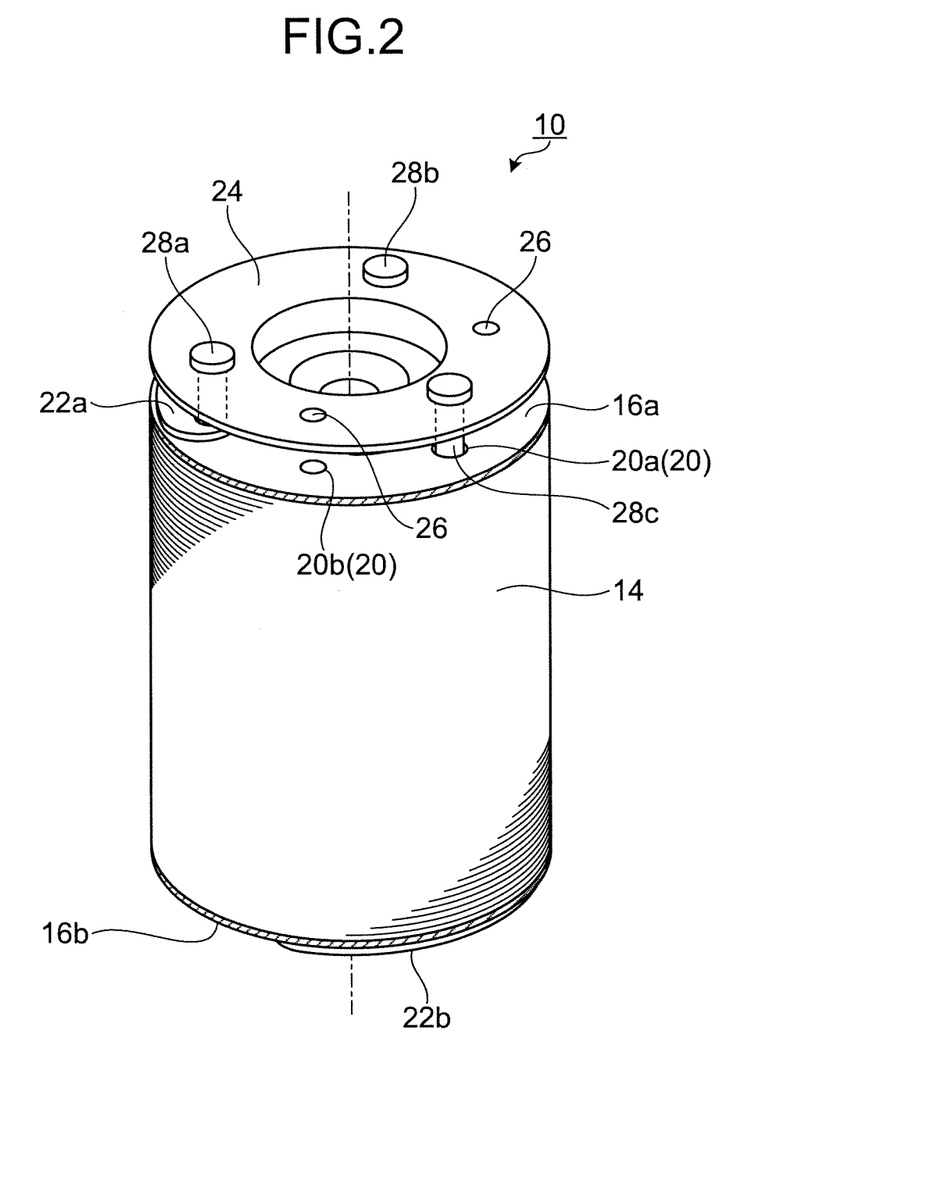
FIG. 2 is a top perspective view of the motor rotor according to the present invention.

As illustrated in FIGS. 1 and 2, a motor rotor 10 of the present invention includes a cylindrical rotor laminated steel plate 14 having a shaft hole 12 and rotor end plates 16a and 16b. The motor rotor 10 is provided with six refrigerant gas holes 18 that are elongated in the circumferential direction around the shaft hole 12 and six rivet holes 20 that are equally spaced apart in the circumferential direction on the outside of the refrigerant gas holes 18 in the radial direction. The refrigerant gas holes 18 and the rivet holes 20 each pass through the motor rotor 10 in the axial direction.

Figure 3:
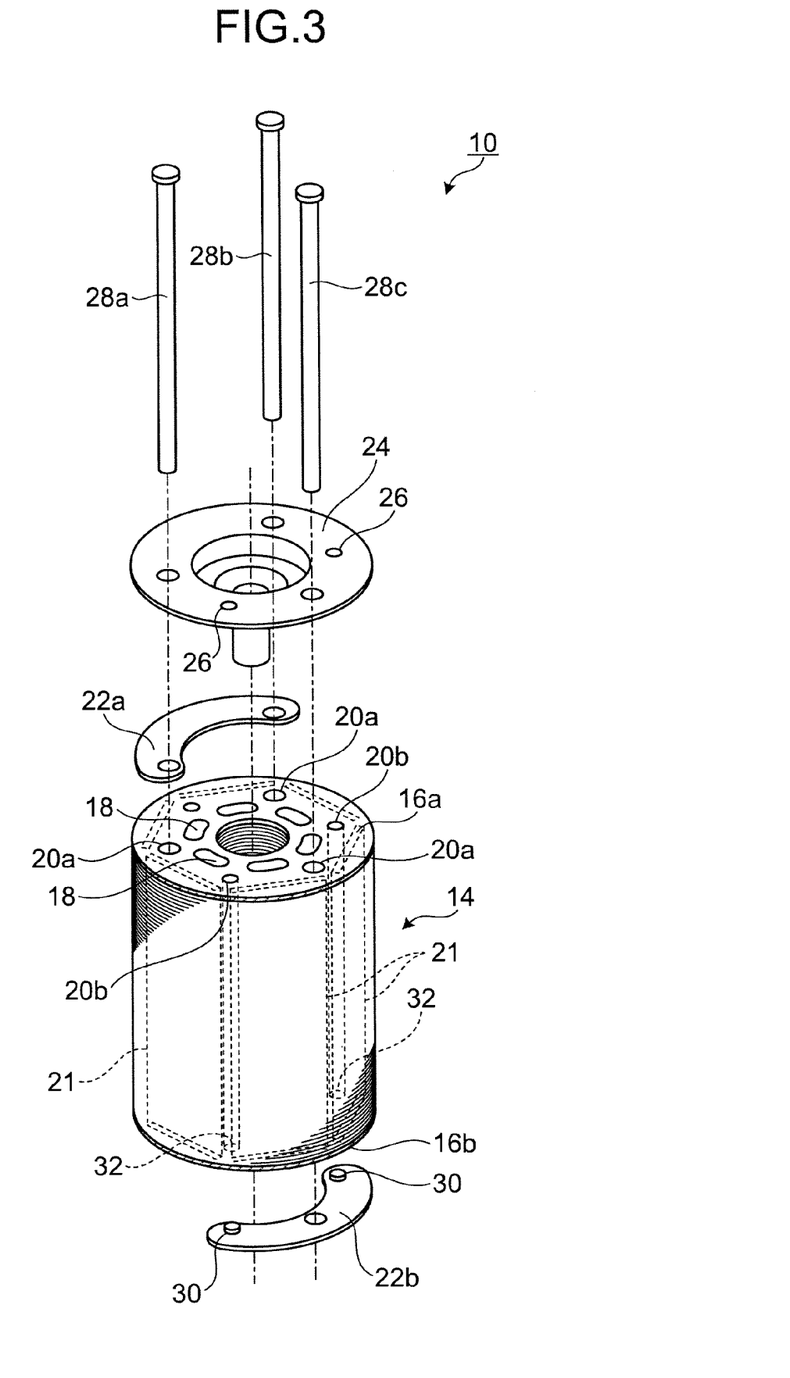
FIG. 3 is an exploded top perspective view of the motor rotor according to the present invention.

As illustrated in FIG. 3, the rivet holes 20 are arranged rotationally symmetrical at positions not interfering with six magnets 21 (permanent magnets) that are arranged rotationally symmetrical in the rotor laminated steel plate 14. Since rivets are preferably inserted at positions equally spaced apart in the circumferential direction to fix rotor components, they are inserted into three dedicated rivet holes 20a equally spaced apart in the circumferential direction. That is, no rivet is inserted into three of the six rivet holes 20.

Among the three rivet holes 20 into which no rivet is inserted, two that are not covered by a balance weight 22a are used as positioning holes 20b to insert positioning pins upon magnetization of the rotor. The remaining one is hidden beneath the balance weight 22a.

The refrigerant gas holes 18 are formed at rotationally symmetric positions near the shaft hole 12 where they do not degrade the motor efficiency by narrowing the magnetic path in the rotor 10.

Figure 4:
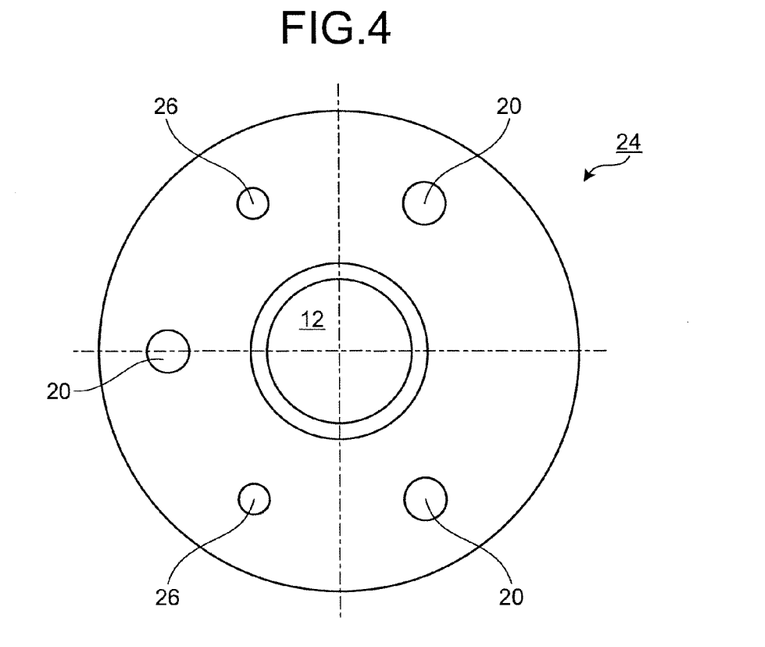
FIG. 4 is a top view of an oil separation plate of the motor rotor according to the present invention.

Provided on the end surface of the rotor 10 on the opposite side of the compression unit is an oil separation plate 24 to improve the oil separation efficiency. The oil separation plate 24 is formed of a thin plate so that it can be easily fabricated by pressing. As illustrated in FIGS. 3 and 4, the oil separation plate 24 is provided with through holes 26 at positions corresponding to the positioning holes 20b of the rotor 10 so that the positioning pins can be inserted into the positioning holes 20b of the rotor 10. Thus, the positioning pins can be inserted through the through holes 26 into the rotor 10.

Figure 5:
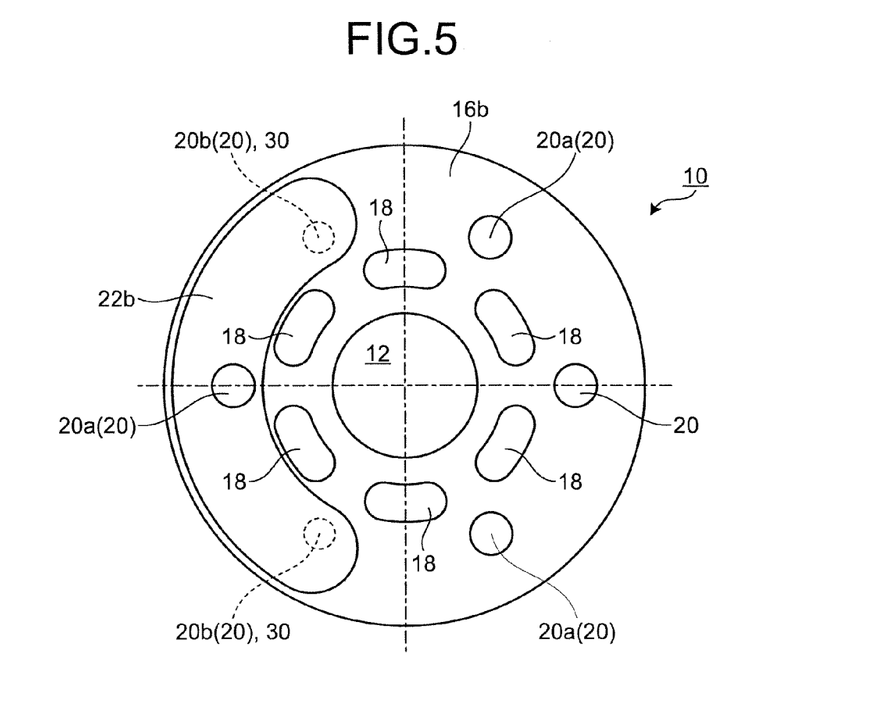
FIG. 5 is a bottom view of the motor rotor according to the embodiment of the present invention.

As illustrated in FIGS. 3 and 5, the motor rotor 10 is provided with arched plate-like balance weights 22a and 22b on both the end surfaces. The upper and lower balance weights 22a and 22b are located at positions having a phase difference of 180°. The upper balance weight 22a is fixed via the rotor end plate 16a to the rotor laminated steel plate 14 by rivets 28a and 28b passing through the two dedicated rivet holes 20a at the ends.

The lower balance weight 22b is fixed via the rotor end plate 16b to the rotor laminated steel plate 14 by a rivet 28c passing through the one dedicated rivet hole 20a at the center. The balance weight 22b is positioned by the engagement between two protrusions 30 formed at the ends and recesses 32 formed in the rotor end plate 16b.

Figure 6:
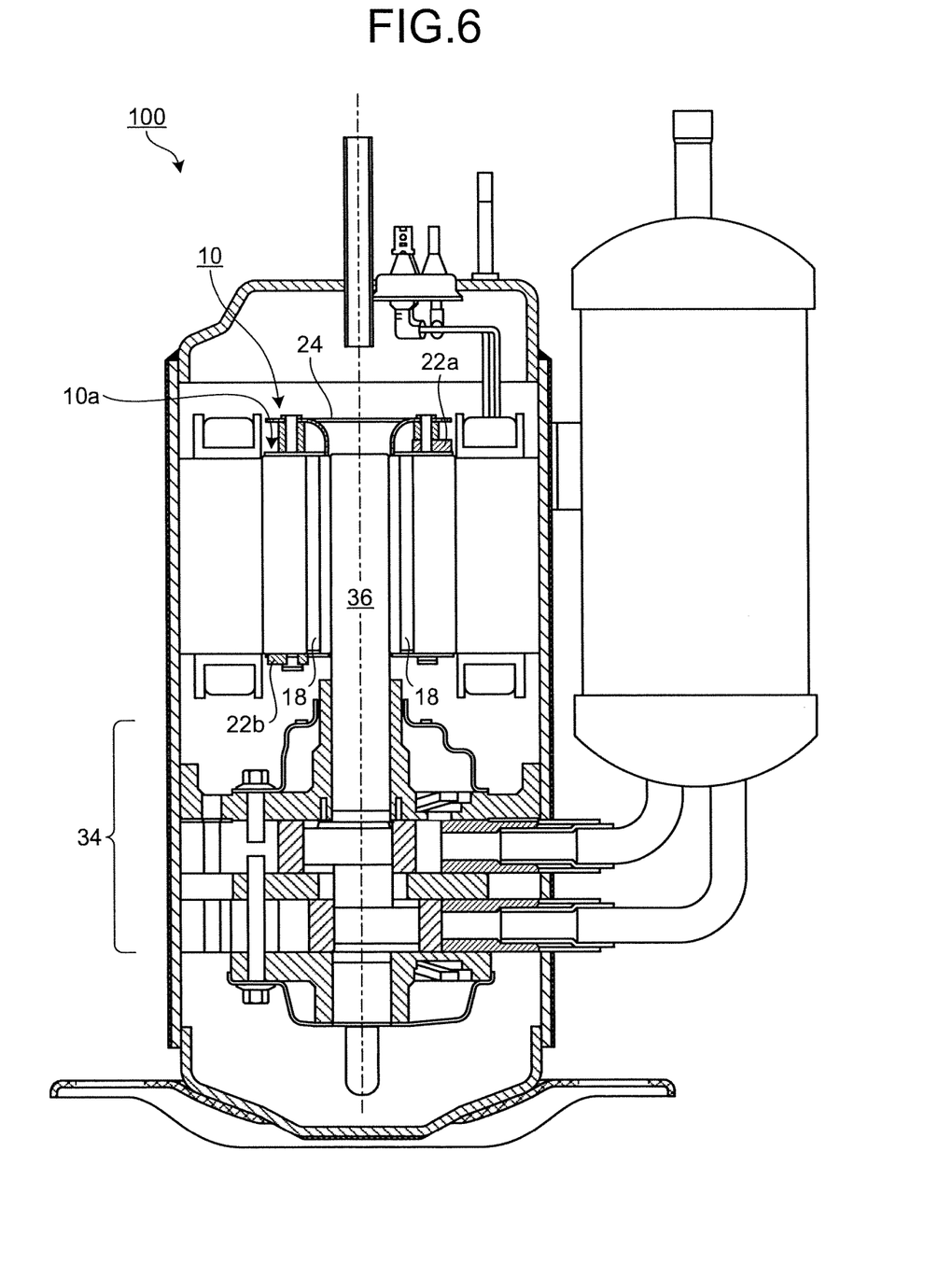
FIG. 6 is a cross-sectional view of a compressor according to the present invention.

A description will be given of a compressor provided with the motor rotor 10 according to the embodiment of the present invention. FIG. 6 is a cross-sectional view of a rotary compressor provided with the motor rotor of the present invention.

In the manufacturing process of a rotary compressor 100 as illustrated in FIG. 6, the motor rotor 10 is magnetized after being fixed to a shaft 36 of a compression unit 34 by shrink fitting. Since the motor rotor 10 is fixed to the shaft 36 of the compression unit 34, the positioning pins are inserted into the positioning holes 20b located on a rotor end surface 10a on the opposite side of the compression unit distant from the compression unit 34.

As the motor rotor 10 is provided with the oil separation plate 24 on the opposite side of the compression unit, the positioning pins are inserted into the positioning holes 20b of the motor rotor 10 through the through holes 26 of the oil separation plate 24. By the insertion of the positioning pins into the motor rotor 10, the position of the motor rotor 10 in the rotation direction is set at a predetermined position. Then, the motor rotor 10 is magnetized. At this time, a magnetic force is exerted to rotate the rotor 10, and thus the positioning pins also prevent the rotation. After compression of the magnetization, the positioning pins are removed from the motor rotor 10, and the process moves to the next step.

As described above, if at least one of the plurality of rivet holes 20 provided to the motor rotor 10 has no rivet inserted therethrough and is used as a positioning hole at the time of rotor magnetization, there is no need to change the shape of the refrigerant gas holes 18 that influence the oil separation efficiency, and also no separate positioning hole is required. With this, no newly formed hole degrades the motor efficiency by narrowing the magnetic path in the rotor 10. Moreover, since the refrigerant gas holes 18 are not used as positioning holes, the size of the refrigerant gas holes 18 can be sufficiently ensured, and therefore the oil separation efficiency is not degraded. Thus, it is possible to obtain the compressor 100 with low oil discharge amount without degrading the motor efficiency.

Furthermore, even if the motor rotor 10 has a structure in which the oil separation plate 24 is formed of a thin plate, a decrease in oil separation efficiency can be suppressed to the minimum because it suffices to form the through holes 26 as small as rivet holes in the oil separation plate 24 so that the positioning pins can be inserted into the positioning holes 20b on the rotor laminated steel plate 14 side.

In the above embodiment, while a motor rotor with six rotor magnetic poles is described, the motor rotor of the present invention is not limited to a 6-pole rotor, but may be a 4-pole rotor having four magnets (permanent magnets) arranged rotationally symmetrical in the rotor laminated steel plate 14 or a motor rotor having a plurality of poles except four.

As described above, according to the present invention, in a motor rotor including a substantially cylindrical rotor laminated steel plate having permanent magnets therein, the rotor laminated steel plate is provided with a plurality of refrigerant gas holes passing therethrough in the axial direction and a plurality of rivet holes arranged in the circumferential direction and passing therethrough in the axial direction. At least one of the rivet holes is used as a positioning hole to insert a positioning pin for positioning in the rotation direction at the time of rotor magnetization. With this, there is no need to change the shape of the refrigerant gas holes that influence the oil separation efficiency, and also no positioning hole is required independently of the rivet holes. Accordingly, it is possible to avoid adverse effects on the magnetic path in the rotor 10. Thus, it is possible to suppress a decrease in oil separation efficiency and to avoid a decrease in motor efficiency.

INDUSTRIAL APPLICABILITY

As described above, a motor rotor according to the present invention is suitably applied to a motor rotor having a plurality of holes such as refrigerant gas holes, rivet holes, and positioning holes, and especially suitable to a motor rotor of sealed rotary compressors such as scroll compressors used in freezers and the like.

The invention claimed is:

1. A motor rotor comprising:
a substantially cylindrical rotor laminated steel plate that includes a permanent magnet therein; and
an oil separation plate that is arranged concentrically on an end surface of the rotor laminated steel plate, wherein
the rotor laminated steel plate includes:
a plurality of refrigerant gas holes passing through the rotor laminated steel plate in an axial direction; and
a plurality of rivet holes arranged in a circumferential direction and passing through the rotor laminated steel plate in the axial direction, and
at least one of the rivet holes is used as a positioning hole to insert a positioning pin for positioning in a rotation direction upon rotor magnetization, and
the oil separation plate is provided with a hole that allows the positioning pin to be inserted therethrough at a position corresponding to the positioning hole.

2. The motor rotor according to claim 1 with six rotor poles, wherein
the rivet holes are arranged at six positions equally spaced apart in the circumferential direction,
three of the rivet holes arranged equally spaced apart in the circumferential direction are used as dedicated rivet holes into which only rivets are inserted, and
other rivet holes are each used as the positioning hole.

3. The motor rotor according to claim 1 with six rotor poles, wherein
the rivet holes are arranged at six positions equally spaced apart in the circumferential direction,
three of the rivet holes arranged equally spaced apart in the circumferential direction are used as dedicated rivet holes into which only rivets are inserted, and
other rivet holes are each used as the positioning hole.

4. A compressor comprising:
a motor rotor that includes a substantially cylindrical rotor laminated steel plate including a permanent magnet therein; and
an oil separation plate that is arranged concentrically on an end surface of the rotor laminated steel plate, wherein
the rotor laminated steel plate includes:
a plurality of refrigerant gas holes passing through the rotor laminated steel plate in an axial direction; and
a plurality of rivet holes arranged in a circumferential direction and passing through the rotor laminated steel plate in the axial direction, and
at least one of the rivet holes is used as a positioning hole to insert a positioning pin for positioning in a rotation direction upon rotor magnetization, and
the oil separation plate is provided with a hole that allows the positioning pin to be inserted therethrough at a position corresponding to the positioning hole.

5. The compressor according to claim 4, wherein
the motor rotor has six rotor poles,
the rivet holes are arranged at six positions equally spaced apart in the circumferential direction,
three of the rivet holes arranged equally spaced apart in the circumferential direction are used as dedicated rivet holes into which only rivets are inserted, and
other rivet holes are each used as the positioning hole.

6. The compressor according to claim 4, wherein
the motor rotor has six rotor poles,
the rivet holes are arranged at six positions equally spaced apart in the circumferential direction,
three of the rivet holes arranged equally spaced apart in the circumferential direction are used as dedicated rivet holes into which only rivets are inserted, and
other rivet holes are each used as the positioning hole.

7. A motor rotor comprising:
a substantially cylindrical rotor laminated steel plate that includes a permanent magnet therein; and
arched plate-like balance weights located at positions having a phase difference of 180 degrees on both end surfaces of the motor rotor, wherein
the rotor laminated steel plate includes:
    a plurality of refrigerant gas holes passing through the rotor laminated steel plate in an axial direction; and
    a plurality of rivet holes arranged in a circumferential direction and passing through the rotor laminated steel plate in the axial direction, and
at least one of the rivet holes is used as a positioning hole to insert a positioning pin for positioning in a rotation direction upon rotor magnetization, and
one of the balance weights is positioned by protrusions formed at ends of the one of the balance weights.

8. A compressor comprising a motor rotor that includes:
a substantially cylindrical rotor laminated steel plate including a permanent magnet therein; and
arched plate-like balance weights located at positions having a phase difference of 180 degrees on both end surfaces of the motor rotor, wherein
the rotor laminated steel plate includes:
    a plurality of refrigerant gas holes passing through the rotor laminated steel plate in an axial direction; and
    a plurality of rivet holes arranged in a circumferential direction and passing through the rotor laminated steel plate in the axial direction; and
arched plate-like balance weights located at positions having a phase difference of 180 degrees on both end surfaces of the motor rotor, and
at least one of the rivet holes is used as a positioning hole to insert a positioning pin for positioning in a rotation direction upon rotor magnetization, and
one of the balance weights is positioned by protrusions formed at ends of the one of the balance weights.

\* \* \* \* \*